No. 12,694. REISSUED SEPT. 10, 1907.

B. T. BRUCE.

TYPE WRITER CARRIAGE.

APPLICATION FILED NOV. 9, 1906.

2 SHEETS—SHEET 1.

WITNESSES
K. Frankfort
M. Mickens.

INVENTOR
Brainard T. Bruce
BY HIS ATTORNEY
B. B. Stickney

No. 12,694. REISSUED SEPT. 10, 1907.

B. T. BRUCE.

TYPE WRITER CARRIAGE.

APPLICATION FILED NOV. 9, 1906.

2 SHEETS—SHEET 2.

WITNESSES
H. Frankfort
M. Mickens

INVENTOR
Brainard T. Bruce

BY HIS ATTORNEY
B. C. Stickney

UNITED STATES PATENT OFFICE.

BRAINARD T. BRUCE, OF JERSEY CITY, NEW JERSEY, ASSIGNOR TO UNDERWOOD TYPE-WRITER COMPANY, OF NEW YORK, N. Y., A CORPORATION OF NEW JERSEY.

TYPE-WRITER CARRIAGE.

No. 12,694. Specification of Reissued Letters Patent. Reissued Sept. 10, 1907.

Original No. 12,508, dated July 17, 1906, Serial No. 314,313. Application for reissue filed November 9, 1906. Serial No. 342,752.

*To all whom it may concern:*

Be it known that I, BRAINARD TAYLOR BRUCE, a citizen of the United States, and a resident of Jersey City, in the county of Hudson and State of New Jersey, have invented certain new and useful Improvements in Type-Writer Carriages, of which the following is a specification.

My invention relates to carriages for typewriters and like machines, and has for its object to provide improved means for holding and feeding a plurality of writing-surfaces for the purpose, as an instance, of enabling a series of originals to be produced successively on separate sheets of paper while duplicates thereof are made at the same time on a continuous sheet or strip.

The invention will be fully described hereinafter and the features of novelty pointed out in the appended claims.

Reference is to be had to the accompanying drawings, in which—

Figure 1:
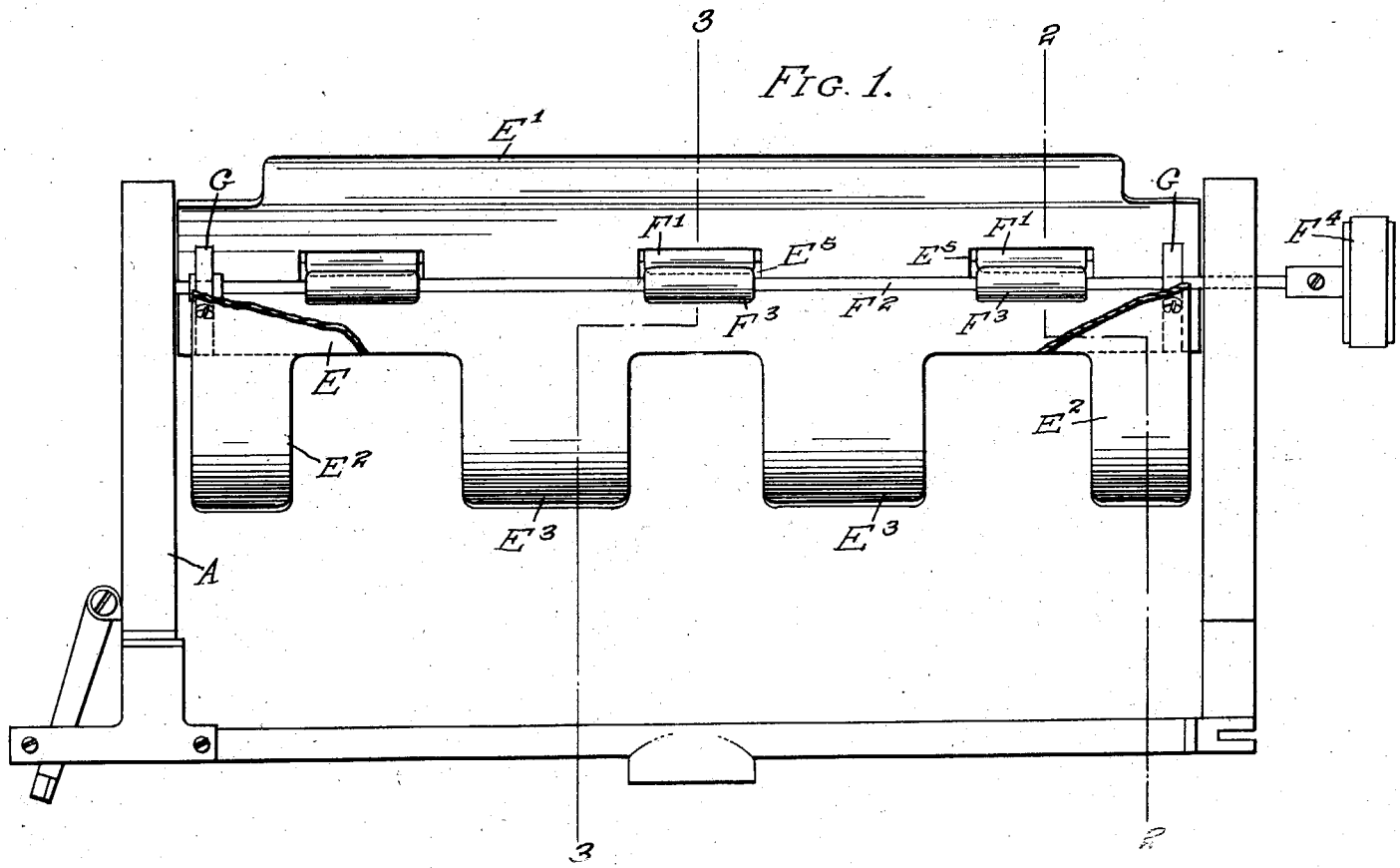
Figure 2:
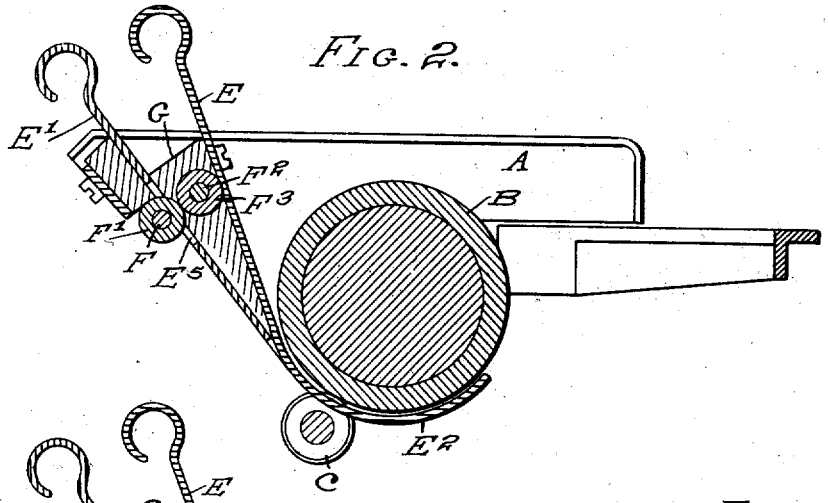
Figure 3:
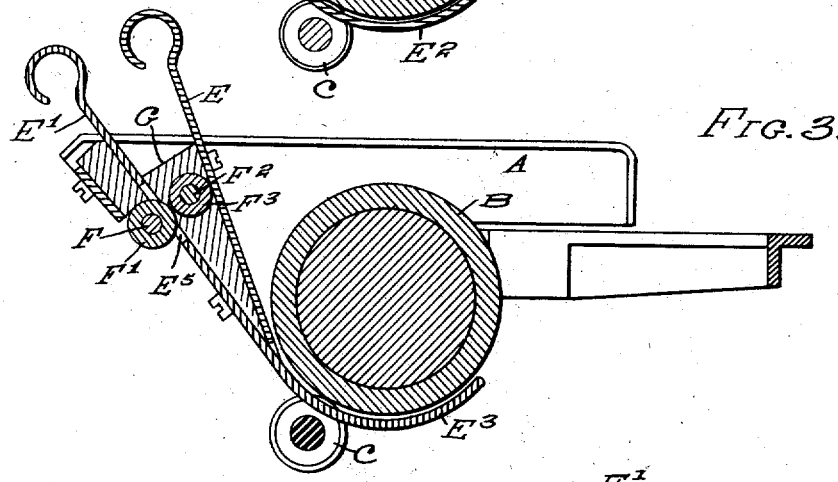
Figure 4:
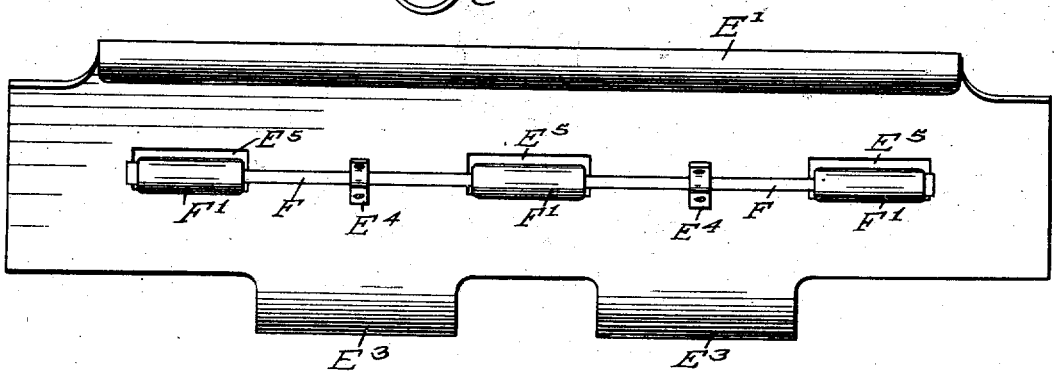

Figure 1 is a top view, with parts broken away, of so much of a typewriter carriage as is required to illustrate my invention. Figs. 2 and 3 are sectional elevations on lines 2, 2 and 3, 3, respectively, of Fig. 1; and Fig. 4 is a rear view of the rear paper-shelf.

A designates the frame carrying the platen B. These parts may be constructed in any approved manner, as may also the feed rollers C, which coöperate with the platen B to bring the paper forward.

In rear of the platen (in case of a front strike machine) are located two paper-shelves E E′, converging toward the platen and terminating about tangentially thereto. One of these shelves, or both, may be provided with guide-fingers conforming to the curvature of the platen and lying close thereto. In the construction illustrated the fingers $E^2$ of the front shelf E are located at the ends and the fingers $E^3$ of the rear shelf at the center, with sufficient space between adjacent fingers to accommodate the feed rollers C. Other means, however, may be provided for properly guiding the paper around the platen B.

For feeding the paper or writing-surface which passes between the shelves E E′, I provide a separate device independent of the rollers C. This auxiliary device, as shown, may consist of a series of rubber rollers F′, secured to or journaled upon an axle or shaft F, which is carried by brackets E on the rear of the shelf E′. These rollers F′ are located mainly in the rear of said shelf, but project through openings $E^5$ therein, so that the said rollers are about flush with the supporting-surface of the shelf E′ or slightly in advance thereof. Between the two shelves and immediately adjacent to the rollers F′ is located another set of rollers $F^3$, secured upon a shaft $F^2$, which is journaled in stationary plates or brackets G. The front shelf E may also be secured to these brackets, preferably in such a manner as to be removable readily. A handle or knob $F^4$ is provided at the end of the shaft $F^2$ to enable it to be turned.

In the use of my invention a long strip of paper with a strip of copying-paper under it is fed between the platen B and the front shelf E. A sheet of letter-paper or the like is then inserted between the rollers F′ and $F^3$, and by turning the handle $F^4$ the sheet of paper is fed downward until it is within the reach of the platen B and the ordinary feed-rollers C. By then turning the platen both the sheet of paper and the strip will be fed simultaneously to the printing position. After the sheet of paper has been written upon and removed from the machine the next sheet is inserted and fed to the proper position by the rollers F′ and $F^3$, while the strip remains stationary until the platen is turned to feed both the sheet and the strip. Thus there will be preserved on the strip a continuous record or copy of all matters written upon the separate sheets of paper. If desired, the front shelf E may be removed and then the machine can be used in the customary manner with or without the auxiliary feed-rollers F′ $F^3$. The provision of the feed-rollers C is not absolutely essential. I have illustrated them because this is the usual construction.

When removing the separate typewritten sheets of paper, it will be understood that the duplicate sheet or strip is retained in the machine against the platen (which also remains stationary) by the fingers $E^2$, which do not engage said separate or original sheets. When the platen rotates, the feed rollers C coöperate therewith; but when paper is being adjusted around the stationary platen, said feed rollers C are not usually in operation or effective. The separate sheets or originals may hence be adjusted by the auxiliary feeding rolls F′, $F^3$ to any point relatively to the stationary duplicate sheet, which is confined by the fingers $E^2$ against the stationary platen during such adjustment of the separate sheets; and this adjustment is readily effected as well when the usual rollers C′ are temporarily out of use as when they are omitted altogether, since in either case the fingers $E^3$ serve to guide forwardly around the under side of the platen the separate paper sheets which are being fed forward by the auxiliary cooperating rolls F′, $F^3$. And if the feed rolls C are omitted, the fingers $E^2$ either alone in the case of narrow sheets, or acting with the fingers $E^2$ in the case of wide sheets, will coöperate with the revolving platen to bring or feed the paper forward.

Various modifications may be made without departing from the nature of my invention.

I claim as my invention and desire to secure by Letters Patent:

1. In a typewriter or like machine, a platen and a plurality of paper-shelves located adjacent thereto and provided with fingers conforming to the curvature of the platen, the fingers of all of the shelves lying in the same cylindrical surface.

2. In a typewriter or like machine, a platen and a plurality of paper-shelves located adjacent thereto and each provided with fingers extending partly around the platen at different points thereof, the fingers of all of the shelves lying in the same cylindrical surface.

3. In a typewriter or like machine, a platen, a plurality of downwardly and forwardly inclined paper-shelves leading independently to the lower rear side thereof, and a manually-operable device located between said shelves for feeding sheets toward the platen while the latter is stationary.

4. In a typewriter or like machine, a platen, a plurality of downwardly and forwardly inclined paper-shelves leading independently to the lower rear side thereof, and a manually-operable device independent of the platen for feeding the paper between said shelves toward the platen while the latter is stationary.

5. In a typewriter or like machine, a platen, a plurality of downwardly and forwardly inclined paper-shelves leading to the lower rear side thereof, a set of manually-operable feed-rollers projecting through one of said shelves, and another set of feed-rollers arranged between the shelves and coöperating with the first-named set of rollers to feed paper around the platen while the latter is stationary.

6. In a typewriter, the combination of a platen, a series of paper-shelves one behind another in rear of the platen, each extending upwardly and rearwardly from the lower rear side of the platen, and means for guiding around the platen, while the latter is stationary, an outer sheet independently of a sheet confined between the outer sheet and the platen.

7. In a typewriter, the combination with a platen, of a series of paper-shelves, one behind another in rear of the platen, each extending upwardly from the lower rear side of the platen, a rearmost shelf being continued forwardly around the under side of the platen to the front portion thereof.

8. In a typewriter, the combination with a platen, of a series of paper-shelves, one behind another in rear of the platen, each extending upwardly from the lower rear side of the platen, each shelf being continued forwardly around the under side of the platen to the front portion thereof.

9. In a typewriter, the combination with a platen, of two paper-shelves, one behind the other and both in rear of the platen, and extending upwardly from the rear side thereof, and paper-guiding means curving from the rear paper-shelf forwardly beneath the platen to the front side thereof; said forward paper-shelf having means to cooperate with the platen to protect the inner sheet against disarrangement by the movement of an outer sheet around the same.

10. In a typewriting machine, the combination with a platen and a paper-shelf, of a pair of devices at the ends of the platen and leading from said paper shelf, for engaging only the side margins of wide sheets to hold them upon the platen, and means for independently guiding around the platen an outer sheet which is too narrow to be held by said pair of devices, while said wide sheets are held stationary upon the platen by the first pair of devices, said independent guiding means including a second pair of devices mounted between the devices of the first pair and located between the point of intersection of the paper and the printing point.

11. In a typewriter, the combination with a platen, of two paper-shelves one behind the other in rear of the platen, said paper-shelves converging toward the platen, and terminating about tangentially thereto, and provided with forward-extending paper-guiding devices conforming to the curvature of the platen.

12. In a typewriter, the combination with a platen, of two paper-shelves, one behind the other in rear of the platen, and converging downwardly toward the rear lower side thereof, the front shelf having at its ends fingers which curve forwardly around the under side of the platen to the front thereof, and the rear shelf having guiding means curving forwardly around the under side of the platen between said fingers.

13. In a typewriter, the combination of a platen, a series of paper-shelves one behind another in rear of the platen, each extending upwardly and rearwardly from the lower rear side of the platen; said front shelf being removably mounted; and means for guiding around both the platen and a sheet thereon, while platen and sheet are stationary, an outer sheet independently of the inner sheet.

14. In a typewriting machine, the combination of a cylindrical platen, coöperating paper feeding devices and auxiliary paper feeding means that are operable independently of the platen to feed the paper past the printing line.

15. In a typewriting machine, the combination of a cylindrical platen, coöperating paper feeding rollers cooperating therewith, and auxiliary paper feed rollers that are actuated independently of the platen to feed one or more sheets relatively to the platen past the printing line.

16. In a typewriting machine, the combination of a platen, primary paper feed rollers that coöperate with the platen, and auxiliary feed rollers that are at all times maintained out of contact with the platen but are adapted to feed paper thereon past the printing line.

17. In a typewriting machine, the combination of a revoluble platen, means for feeding paper line by line around the platen, and means for feeding a strip of paper line by line around said platen while it remains stationary.

18. In a typewriting machine, the combination of a platen, means for feeding paper line by line around the platen, and independent means mounted above or back of the platen for drawing a strip of paper line by line around said platen; said platen being revoluble while the paper strip remains stationary.

BRAINARD T. BRUCE.

Witnesses:
S. T. SMITH,
M. S. EYLAR.